United States Patent
Watanabe et al.

(10) Patent No.: US 10,654,175 B2
(45) Date of Patent: May 19, 2020

(54) CAM-TYPE HAND MECHANISM

(71) Applicants: SHINANO KENSHI KABUSHIKI KAISHA, Nagano (JP); Mu Lab, LTD., Fukushima (JP)

(72) Inventors: Sadaaki Watanabe, Nagano (JP); Masahide Fushimi, Fukushima (JP)

(73) Assignees: SHINANO KANSHI KABUSHIKI KAISHA, Nagano (JP); MU LAB, LTD., Fukushima (JP)

( * ) Notice: Subject to any disclaimer, the term of this patent is extended or adjusted under 35 U.S.C. 154(b) by 0 days.

(21) Appl. No.: 16/138,570

(22) Filed: Sep. 21, 2018

(65) Prior Publication Data

US 2019/0111573 A1 Apr. 18, 2019

(30) Foreign Application Priority Data

Oct. 16, 2017 (JP) ................. 2017-200284

(51) Int. Cl.
| | | |
|---|---|---|
| *B25J 17/00* | (2006.01) | |
| *B25J 17/02* | (2006.01) | |
| *B25J 18/00* | (2006.01) | |
| *B25J 15/02* | (2006.01) | |
| *B25J 15/00* | (2006.01) | |
| *B25J 15/10* | (2006.01) | |
| *F16H 25/18* | (2006.01) | |
| *F16H 53/02* | (2006.01) | |
| *F16H 53/06* | (2006.01) | |
| *F16H 25/04* | (2006.01) | |

(52) U.S. Cl.
CPC ....... *B25J 15/0226* (2013.01); *B25J 15/0028* (2013.01); *B25J 15/028* (2013.01); *B25J 15/10* (2013.01); *F16H 25/18* (2013.01); *F16H 25/04* (2013.01); *F16H 53/025* (2013.01); *F16H 53/06* (2013.01)

(58) Field of Classification Search
CPC ....... B25J 15/0266; B25J 15/10; F16H 25/18; F16H 53/06; F16H 25/16
See application file for complete search history.

(56) References Cited

U.S. PATENT DOCUMENTS

| | | | |
|---|---|---|---|
| 8,418,572 B2 | 4/2013 | Takahashi et al. | |
| 10,081,111 B1* | 9/2018 | Xiong | ........... B25J 15/10 |
| 10,307,213 B2* | 6/2019 | Holop | ........... A61B 34/30 |
| 2009/0235785 A1* | 9/2009 | Kim | ........... B25B 27/0042 |
| | | | 81/57.33 |

FOREIGN PATENT DOCUMENTS

JP 4448554 4/2010

* cited by examiner

*Primary Examiner* — Jake Cook
(74) *Attorney, Agent, or Firm* — Steven J. Weyer, Esq.; Stites & Harbison, PLLC

(57) ABSTRACT

A cam pedestal member includes a plurality of three-dimensional cams including a plurality of cam guiding surfaces continuing over a range from a through hole provided at a center of a cam base portion to an outer peripheral side, and being formed upright at a plurality of positions. The cam base portion includes coupling portions coupling the cam pedestal member directly or indirectly to a rotor shaft at plurality of positions in gap areas between radially inner ends and radially outer ends of the adjacent three-dimensional cams.

5 Claims, 8 Drawing Sheets

SECTIONAL VIEW X-X

SECTIONAL VIEW X-X

CAM-TYPE HAND MECHANISM

CROSS-REFERENCE TO RELATED APPLICATION

This application is based upon and claims the benefit of priority of the prior Japanese Patent Application No. 2017-200284, filed on Oct. 16, 2017, and the entire contents of which are incorporated herein by reference.

TECHNICAL FIELD

The present invention relates to a cam-type hand mechanism provided with a three-dimensional cam.

BACKGROUND ART

In the related art, for bending and stretching of joints of robot hands or robot arms, rotary drive of a drive source is transmitted by various driving mechanisms such as a gear mechanism or a wire motion mechanism. The gear mechanism has problems such as low controllability due to backrush of gears and size or weight increases due to the presence of gear trains, while the wire motion mechanism has problems such as low controllability due to the necessity of adjustment of wire tension and probability of wire elongation, and increases in number of parts and size due to the necessity of a mechanism for rotating the wire.

As countermeasures for these problems, a three-dimensional cam mechanism is proposed. The three-dimensional cam mechanism includes a cam rotary shaft coupled to a motor shaft and supported by a supporting member, and is configured to convert a rotary motion of a three-dimensional cam into a swinging motion of a driven-side link by the driven-side link supported by the above-described supporting member being guided by a cam guiding surface of the three-dimensional cam rotating about the cam rotary shaft. Accordingly, with a flexible design of a shape of the cam guiding surface, a smooth swinging motion of the driven-side link is achieved without causing backrush as in the gear mechanism (see PTL 1: Japanese Patent No. 4448554, PTL 2: Japanese Patent No. 4388566).

SUMMARY OF INVENTION

Technical Problem

In order to exchange the three-dimensional cam for changing, for example, a trajectory of the driven-side link in the three-dimensional cam mechanism described in PTL 1 and PTL 2 described above, all parts including the supporting member supporting the cam rotary shaft coupled to the motor shaft, the three-dimensional cam supported by the supporting member, and the driven-side link need to be replaced. Therefore, a significant number of parts are to be replaced, and thus much labor and much maintenance costs are required for replacement parts.

In addition, for achieving multifunctionality of a robot hand, there is a need for controlling an open-close operation of a hand and simultaneously taking images from a center portion of the hand in addition to the simple open-close operation of the hand. In this case, the three-dimensional cam needs to be rotated by using a hollow rotary shaft coupled to the motor shaft, and thus the parts may be upsized and may have a heavy weight as a whole, which in turn generates a need for minimizing the number of replacement parts.

Solution to Problem

In response to the above issue, it is an object of the present disclosure to provide a cam-type hand mechanism including a three-dimensional cam and claw portions configured to open and close in association with a rotary motion of the three-dimensional cam, and requiring minimum replacement parts of the hand mechanism to reduce maintenance costs and prevent or reduce upsizing in association with multifunctionality of the hand mechanism.

In order to achieve the above-described object, embodiments described below have following configurations.

A first aspect of the present disclosure provides a cam-type hand mechanism including: a motor; a cam pedestal member, the cam pedestal member including a cam base portion detachably assembled directly or indirectly to a rotor shaft extending from the motor, three-dimensional cams including a plurality of cam guiding surfaces continuing over a range from a through hole provided at a center of the cam base portion to an outer peripheral side, and being formed upright at a plurality of positions; and a hand mechanism assembled to the motor constantly in abutment with the three-dimensional cam, the hand mechanism including a plurality of claw portions openable and closable about an axial line of the rotor shaft in association with a rotary motion of the three-dimensional cam, wherein the cam base portion includes coupling portions configured to couple the cam pedestal member directly or indirectly to the rotor shaft at a plurality of positions in gap areas between radially inner ends and radially outer ends of the adjacent three-dimensional cams.

According to the configuration described above, the cam base portion provided with a plurality of the three-dimensional cams includes the coupling portions for coupling the cam pedestal member and the rotor shaft directly or indirectly at a plurality of positions in the gap areas between the radially inner ends and the radially outer ends of the adjacent three-dimensional cams. Therefore, the cam pedestal member and the hand mechanism may be downsized compared with a case where the coupling portion is provided on further outer peripheral side of the three-dimensional cams formed on the cam base portion, and the hand mechanism may be replaced with a hand mechanism different in number and shape of the claw portions by attaching and detaching the cam pedestal member directly or indirectly to the rotor shaft. In particular, since the coupling portions are provided in the gap areas between the radially inner ends and the radially outer ends of the adjacent three-dimensional cams, upsizing in a radial direction of the cam pedestal member is avoided. In addition, upsizing as a result of multifunctioning such as provision of imaging unit in the through hole provided at the center portion of the cam base portion may be avoided.

Preferably, the rotor shaft is provided at an axial end with motor-side coupling portions at a plurality of positions, the motor-side coupling portions corresponding to cam-side coupling portions provided on the cam base portion. Accordingly, replacement of the hand mechanism is achieved only by attaching and detaching the cam pedestal member to and from the axial end of the rotor shaft by aligning the cam-side coupling portions and the motor-side coupling portions.

The cam-side coupling portions and the motor-side coupling portions are screw holes, and the cam pedestal member is detachably attached to the axial end of the rotor shaft by aligning screw holes with each other and screw-fitting screws.

Accordingly, by aligning and screw-fitting the screw holes on the cam pedestal member side and the side screw holes on the motor side, the hand mechanism may be replaced with a hand mechanism different in number and shape of the claw portions by attaching and detaching the cam pedestal member directly or indirectly to and from the axial end of the rotor shaft.

Preferably, the hand mechanism includes a hand base portion assembled to the motor; and claw supporting portions configured to rotatably support the claw portions about an axis orthogonally disposed with respect to a direction of the axial line of the rotor shaft, and the claw portions slide in a state in which a plurality of cam follower surfaces provided at root end portions are in constantly abutment with the corresponding cam guiding surfaces.

Accordingly, the cam pedestal member assembled directly or indirectly to the rotor shaft rotates in association with the rotation of the motor, the plurality of cam follower surfaces provided at the root portions slide in constantly abutment with the cam guiding surfaces of the corresponding three-dimensional cams in association with the rotary motion of the three-dimensional cams. Consequently, the plurality of claw portions may open and close without generating rattling due to a thrust about the axial line of the rotary shaft.

The rotor shaft may be a hollow shaft provided with a hollow shaft hole, and may be assembled in communication with the through hole provided in the cam base portion of the cam pedestal member.

Accordingly, multifunctioning is achieved by inserting an imaging camera or injecting air in the direction of the axial line from the motor side to the center portion of the hand mechanism through the through hole of the cam base portion communicating with the hollow shaft hole of the rotor shaft extending from the motor.

Advantageous Effects of Invention

Accordingly, the present disclosure provides a cam-type hand mechanism including a three-dimensional cam and claw portions configured to open and close in association with a rotary motion of the three-dimensional cam, and requiring minimum replacement parts to reduce maintenance costs and prevent or reduce upsizing in association with multifunctionality of the hand mechanism.

DESCRIPTION OF EMBODIMENTS

Figure 1:
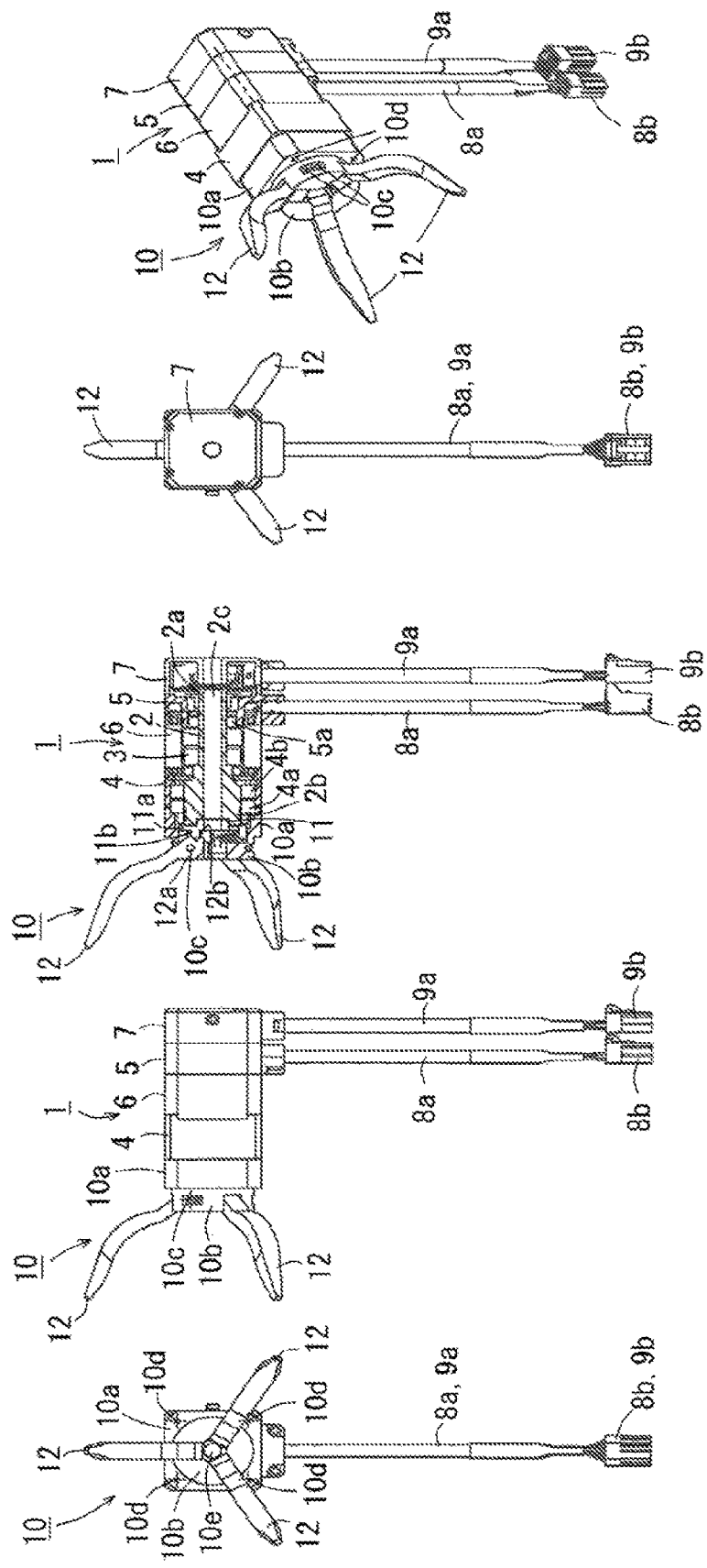
FIGS. 1A to 1E are a front elevation, a right side view, a vertical cross-sectional view, a rear view, and a perspective view of a cam-type hand mechanism having three craw portions.

Referring now to attached drawings, an embodiment of a cam-type hand mechanism according to the present invention will be described. Referring firstly to FIG. 1A to FIG. 4E, a cam-type hand mechanism having three claw portions will be described.

A stepping motor 1 as illustrated in FIG. 1C is used as a drive source for the cam-type hand mechanism. Other motors such as a brushless motor may be used instead of the stepping motor 1. The stepping motor 1 includes a rotor shaft 2 (motor shaft) and a rotor 3 provided with rotor pole teeth and integrally assembled to the rotor shaft 2. The rotor 3 may be of a hybrid type including a permanent magnet clamped in a rotor core. The rotor shaft 2 is rotatably supported to a bearing retaining member 5 via a bearing 5a at one end 2a in a longitudinal direction and to a bearing retaining member 4 via bearings 4a, 4b at the other end 2b in the longitudinal direction. A hollow shaft is desirably used as the rotor shaft 2. A stator 6 having a stator core is provided around the rotor 3. The stator core is provided with fixing pole teeth so as to oppose the rotor pole teeth. A coil is wound around the stator pole teeth via an insulator. An encoder 7 having an encoder disk is provided at the one end 2a of the rotor shaft 2 (see FIGS. 1C, 1D). A connecting line 8a configured to supply electricity to a coil and a connector 8b, and a signal line 9a connected to the encoder 7 and a connector 9b are respectively connected. The other end 2b of the rotor shaft 2 is provided with a hand mechanism 10 including claw portions 12 configured to be openable and closable about an axial line at the three positions (see FIGS. 1A, 1B, 1C, and 1E). The claw portions 12 provided at three positions are provided openably and closably at positions shifted in phase by every 120 degrees about the rotor shaft 2 (see FIG. 1A).

In FIG. 1C, a cam pedestal member 11 is detachably assembled to the other end 2b of the rotor shaft 2. The cam pedestal member 11 is provided with a plurality of three-dimensional cams. The hand mechanism 10 is integrally assembled to the bearing retaining member 4 in constantly abutment with three-dimensional cams 11b, described later, and a plurality of the claw portions 12 are configured to open and close in association with the rotary motion of the three-dimensional cams 11b.

The cam pedestal member 11 is assembled directly to the rotor shaft 2. However, when a decelerator is assembled to the rotor shaft 2 of the stepping motor 1, the cam pedestal member 11 may be assembled to the rotor shaft 2 indirectly via the decelerator.

Figure 3A:
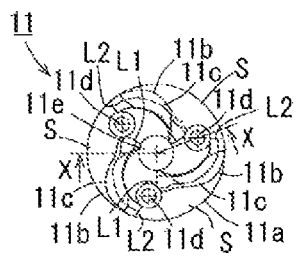
FIGS. 3A to 3G are a plan view, front, back, left, and right views, a cross-sectional view taken along the line X-X, and a perspective view of the cam pedestal member illustrated in FIGS. 1A to 1E.
Figure 3B:
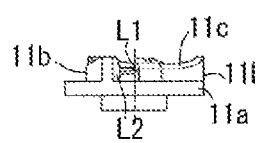
Figure 3C:
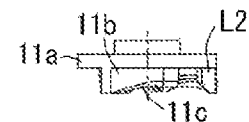
Figure 3D:
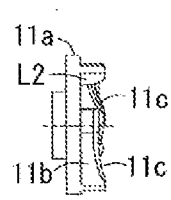
Figure 3E:
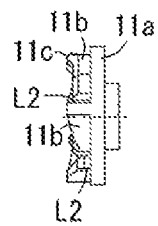
Figure 3F:
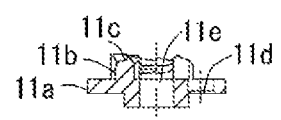
Figure 3G:
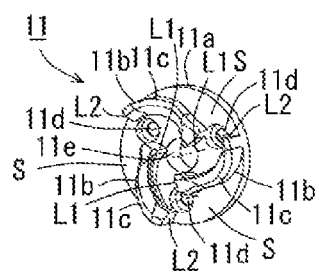
Figure 4C:
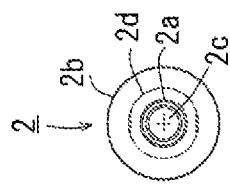
FIGS. 4A to 4E are a front elevation, left, and right side views, a cross-sectional view taken along the line Y-Y, and a perspective view of the motor shaft.
Figure 4B:
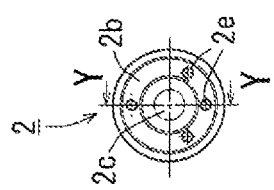
Figure 4E:
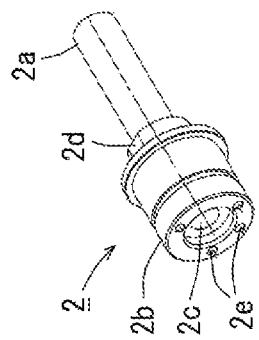
Figure 4A:
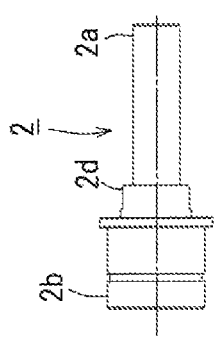
Figure 4D:
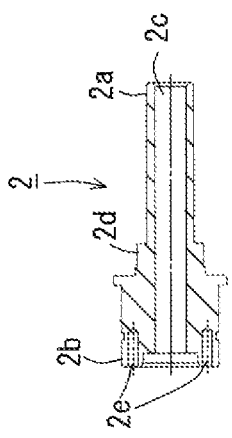

Referring now to FIGS. 3A to 3G, a configuration of the cam pedestal member 11 will be described. A cam base portion 11a of the cam pedestal member 11 is detachably assembled directly or indirectly to the rotor shaft 2 extending from the stepping motor 1. The three-dimensional cams 11b including a plurality of cam guiding surfaces 11c continuing over a range from a through hole 11e provided at a center of the cam base portion 11a to an outer peripheral side are formed upright at a plurality of positions (three positions, for example). In FIG. 3A, the three-dimensional cams 11b are provided over a range from a portion in the vicinity of the through hole 11e of the cam base portion 11a to an outer peripheral edge portion. Each of the cam guiding surfaces 11c of the three-dimensional cams 11b is formed into a curved surface continuing along the longitudinal direction of the three-dimensional cams 11b. The cam base portion 11a is provided with cam-side screw holes 11d (coupling portions) for coupling the rotor shaft 2 and the cam pedestal member 11 at three positions in axial symmetry. Each of the cam-side screw holes 11d is formed at gap area S (see FIGS. 3A and 3G) between a radially inner end L1 of one three-dimensional cam 11b and a radially outer end L2 of adjacent three-dimensional cam 11b. A through hole 11e communicating with a hollow shaft hole 2c (see FIG. 1C) of the rotor shaft 2 is formed at the center of the cam base portion 11a. The cam-side screw holes 11d do not necessarily have to be formed in axial symmetry.

According to the configuration described above, the cam base portion 11a provided with a plurality of the three-dimensional cams 11b includes the cam-side screw holes 11d for coupling the rotor shaft 2 and the cam pedestal member 11 at a plurality of positions in the gap areas S formed between the radially inner ends L1 and the radially outer ends L2 of the adjacent three-dimensional cams 11b. Therefore, the cam pedestal member 11 and the hand mechanism 10 may be downsized compared with a case where the cam-side screw hole 11d is provided on an outer peripheral side of the three-dimensional cams 11b formed on the cam base portion 11a, and the hand mechanism 10 may be replaced with a hand mechanism 10 different in number and shape of the claw portions by attaching and detaching the cam pedestal member 11 with respect to the rotor shaft 2. In particular, since the cam-side screw holes 11d are provided in the gap areas S between the radially inner end L1 and the radially outer end L2 of the adjacent three-dimensional cams 11b, upsizing in the radical direction of the cam pedestal member 11 is avoided. In addition, upsizing as a result of multifunctioning such as provision of imaging unit at a center portion of the cam base portion 11a may be avoided. When a plurality of the cam-side screw holes 11d are formed in axial symmetry, the cam pedestal member 11 has no directionality for attachment and detachment to and from the rotor shaft 2, and thus replacement of the hand mechanism 10 is easily achieved.

Referring now to FIGS. 4A to 4E, a configuration of the rotor shaft 2 will be described.

As illustrated in FIGS. 4A to 4E, the one end 2a of the rotor shaft 2 is coupled to the stepping motor 1. The rotor 3 is assembled to the rotor shaft 2 having a smaller diameter and is assembled with the rotor core abutted to a shouldered portion 2d. The other end 2b of the rotor shaft 2 has a larger diameter and the bearing retaining member 4 is assembled to an outer periphery via the bearings 4a, 4b (see FIG. 1C). The other end 2b of the rotor shaft 2 includes motor-side screw holes 2e (coupling portion) corresponding to the cam-side screw holes 11d provided in the cam base portion 11a at three positions. Accordingly, attachment and detachment of the cam pedestal member 11 to and from the other end portion of the rotor shaft 2 are achieved by aligning the cam-side screw holes 11d and the motor-side screw holes 2e. Note that another motor-side screw hole 2e is provided at a position different in phase by 180 degrees from at least one of the motor-side screw holes 2e provided at the three positions (See FIG. 4B). This additional motor-side screw hole 2e is provided for replacement of the hand mechanism 10 with a hand mechanism 10 having claw portions 12 at two positions by replacing the cam pedestal member 11 as described later.

In this manner, coupling screws are screwed into the cam-side screw holes 11d and the motor-side screw holes 2e aligned to each other to detachably assemble the cam pedestal member 11 to the rotor shaft 2. Therefore, the hand mechanism 10 may be replaced with other hand mechanisms 10 having claw portions different in number or shape by simply replacing the cam pedestal member 11.

An example of the hand mechanism 10 will now be described. A hand base member 10a covers an outer periphery of the cam base portion 11a when being assembled to the stepping motor 1. Specifically, the hand base member 10a may be integrally assembled to the stepping motor 1 side by aligning screw holes 10d provided at four corners of the hand base portion 10a and screw holes 4d provided on a corresponding end surface 4c of the bearing retaining member 4 (see FIG. 2) and fastening with screws, not illustrated (see FIG. 1E). The hand base member 10a is provided with a claw supporting member 10b. The claw supporting member 10b includes the claw portions 12 provided at three positions. Each of the claw portions 12 are axially supported in a manner rotatable about an axis 10c disposed orthogonally to a direction of the axial line of the rotor (See FIGS. 1B and 1E). The claw portions 12 slide in a state in which a plurality of cam follower surfaces 12b provided at root end portions 12a are in constantly abutment with the corresponding plurality of cam guiding surfaces 11c (see FIG. 1C and FIG. 3A). The claw supporting member 10b is also provided with a through hole 10e (see FIG. 1A) communicating with the through hole 11e at a center portion.

Accordingly, the cam pedestal member 11 assembled to the rotor shaft 2 rotates in association with the rotation of the motor 1, the cam follower surfaces 12b provided at the root end portions 12a slide in constantly abutment with the cam guiding surfaces 11c of the corresponding three-dimensional cams 11b in association with the rotary motion of the three-dimensional cams 11b. Consequently, the claw portions 12 provided at three positions about the axial line of the rotor shaft 2 may open and close without generating rattling due to a thrust (see FIG. 1C).

In addition, as described above, the rotor shaft 2 is a hollow shaft, and the cam base portion 11a is respectively provided with the through hole 11e (see FIG. 3A) communicating with the hollow shaft hole 2c and the claw supporting member 10b is provided with the through hole 10e communicating with the through hole 11e (see FIG. 1A). Accordingly, multifunctioning is achieved by inserting an imaging camera or injecting air from the motor 1 side through the through hole 11e of the cam base portion 11a and the through hole 10e of the claw supporting member 10b (see FIG. 1A) communicating with the hollow shaft hole 2c of the rotor shaft 2.

Figure 2:
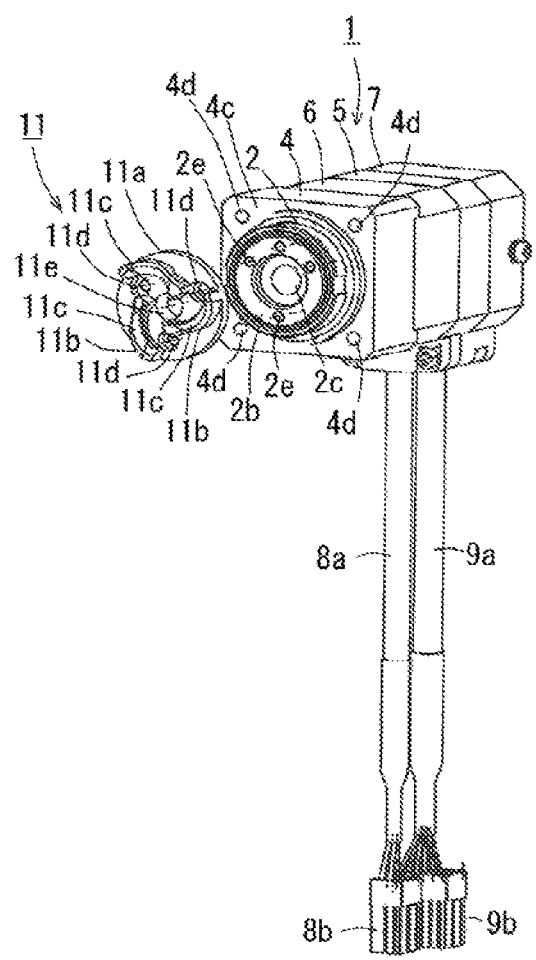
FIG. 2 is a perspective view illustrating a state in which a cam pedestal member and a hand mechanism (not illustrated) are removed from a motor shaft.
Figure 9:
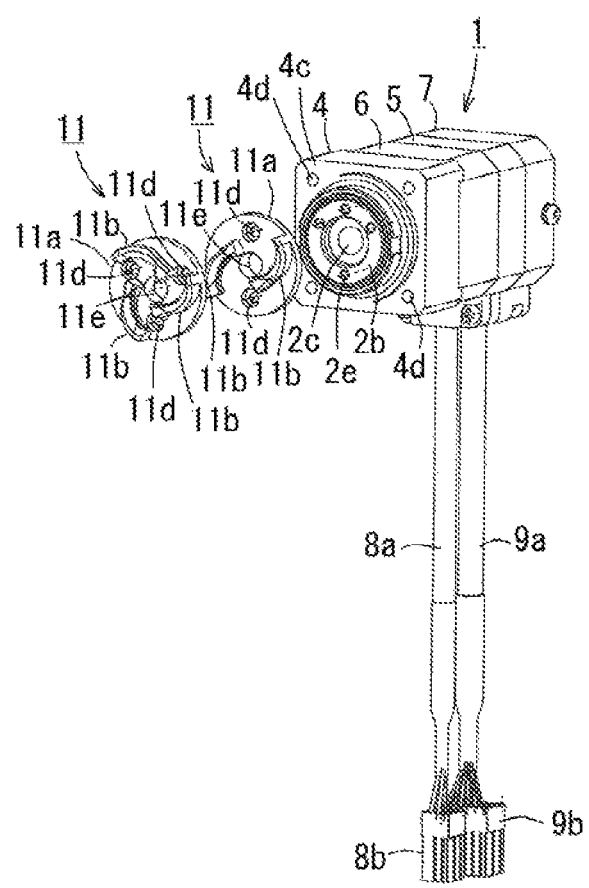
FIG. 9 is an explanatory drawing illustrating a case of replacing a three-claw cam pedestal member and a two-claw cam pedestal member with respect to the motor shaft of the cam-type hand mechanism.

In order to replace the hand mechanism 10, the hand mechanism 10 is demounted from the stepping motor 1 by removing screws, not illustrated, from the screw holes 10d (see FIGS. 1A and 1E) provided at the four corners of the hand base member 10a. Subsequently, as illustrated in FIG. 2, the cam pedestal member 11 is demounted from the other end 2b of the rotor shaft 2 by removing the screws, not illustrated, from the cam-side screw holes 11d provided at three positions of the cam pedestal member 11. Accordingly, replacement with new cam pedestal member 11 and new hand mechanism 10 is achieved. As illustrated in FIG. 9, replacement with a cam pedestal member 11 provided with the three-dimensional cams 11b at two positions and replacement with a hand mechanism provided with the claw portions 12 at two positions (see FIG. 5)are achieved.

In this case, replacement of the cam pedestal member 11 is achieved by aligning the cam-side screw holes 11d (see FIG. 9) formed in the cam pedestal member 11 at two positions different in phase by 180 degrees and the motor-side screw holes 2e formed in the corresponding rotor shaft 2 and securing with screws.

As described thus far, the present disclosure provides the cam-type hand mechanism 10 including the three-dimensional cams 11b and the claw portions 12 configured to open and close in association with a rotary motion of the three-dimensional cam 11b, and requiring minimum replacement parts of the hand mechanism 10 to reduce maintenance costs and prevent or reduce upsizing in association with multi-functionality of the hand mechanism 10.

FIG. 5 to FIG. 9 illustrate another example of the cam-type hand mechanism. In the example described here, the hand mechanism 10 is changed to a hand mechanism 10 including the cam pedestal member 11 and the claw portions 12 at two positions, but the configuration of the stepping motor 1 is not changed (illustration of the encoder 7 is omitted in FIG. 7). The same members as in the example described above are denoted by the same reference numerals and description is applied.

Referring now to FIGS. 8A to 8G, a configuration of the cam pedestal member 11 will be described. The cam pedestal member 11 includes the cam base portion 11a, and the cam base portion 11a includes the three-dimensional cams 11b having a plurality of the cam guiding surfaces 11c continuing from positions in the vicinity of the axial center of the rotor shaft 2 to an outer peripheral edge. The three-dimensional cams 11b are formed upright at two positions of the axially symmetrical positions shifted in phase by 180 degrees (see FIGS. 8A and 8G). The cam base portion 11a is provided with cam-side screw holes 11d (coupling portions) at two positions in axial symmetry. Each of the cam-side screw holes 11d is formed at the gap area S between the radially inner end L1 of one three-dimensional cams 11b and the radially outer end L2 of adjacent three-dimensional cam 11b. The cam-side screw holes 11d are used for coupling the cam pedestal member 11 and the rotor shaft 2. The through hole 11e communicating with the hollow shaft hole 2c of the rotor shaft 2 is formed at the center of the cam base portion 11a (see FIGS. 8A, 8F, and 8G). The cam-side screw holes 11d do not necessarily have to be formed in axial symmetry.

Figure 5:
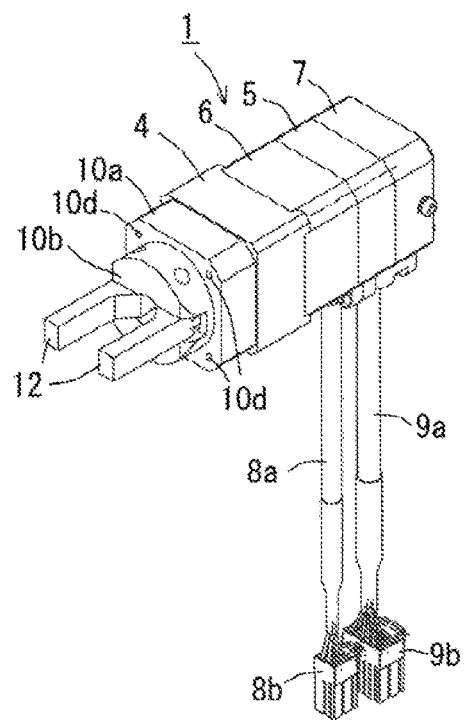
FIG. 5 is a perspective view of a cam-type hand mechanism having two claw portions.
Figure 7:
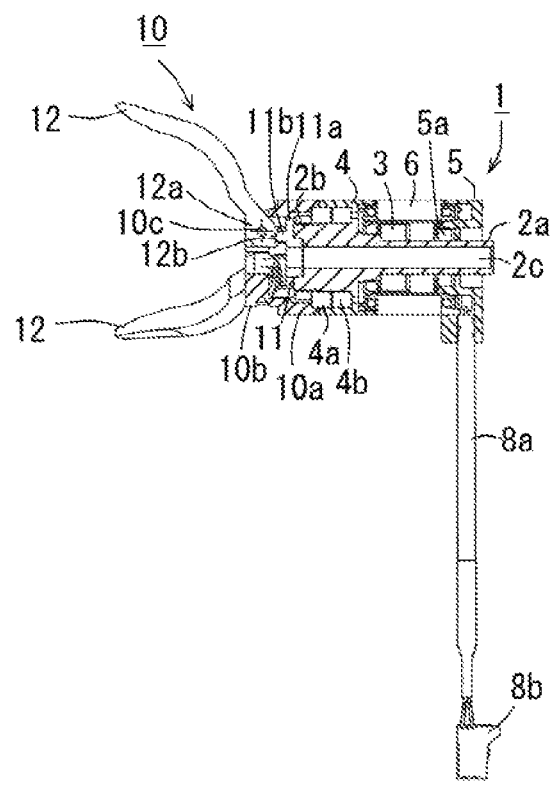
FIG. 7 is a vertical cross-sectional view of the cam-type hand mechanism in FIG. 5 without an encoder portion.
Figure 8A:
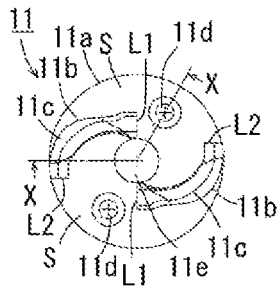
FIGS. 8A to 8G are a plan view, front, rear, left and right side views, a cross-sectional view taken along the line X-X, and a perspective view of the cam pedestal member in FIG. 5.
Figure 8B:
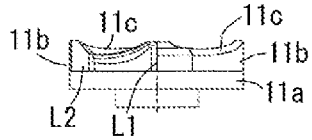
Figure 8C:
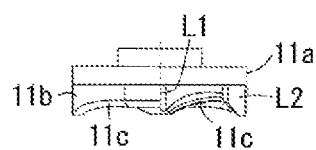
Figure 8D:
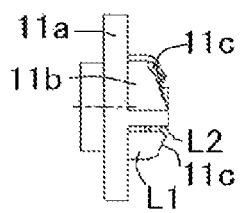
Figure 8E:
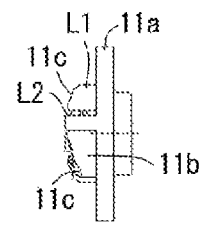
Figure 8F:
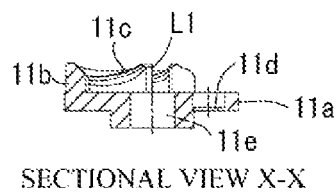
Figure 8G:
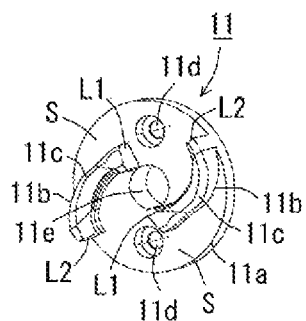

As illustrated in FIG. 7, the hand mechanism 10 is assembled to the stepping motor 1 with an outer periphery of the cam base portion 11a covered with the hand base member 10a. Specifically, the hand base member 10a is integrally assembled to the motor side by aligning the screw holes 10d (see FIG. 5) provided at the four corners of the hand base portion 10a and corresponding screw holes of the bearing retaining member 4 and fastening with screws, not illustrated. In FIG. 5, the hand base member 10a is provided with the claw supporting member 10b. The claw supporting member 10b includes the claw portions 12 provided at two positions different in phase by 180 degrees. Each of the claw portions 12 are axially supported in a manner rotatable about the axis 10c (see FIG. 7) disposed orthogonally to the direction of the axial line of the rotor. The respective claw portions 12 slide in a state in which a plurality of the cam follower surfaces 12b (see FIG. 7) provided at the root end portions 12a are in constantly abutment with the corresponding plurality of cam guiding surfaces 11c.

Figure 6:
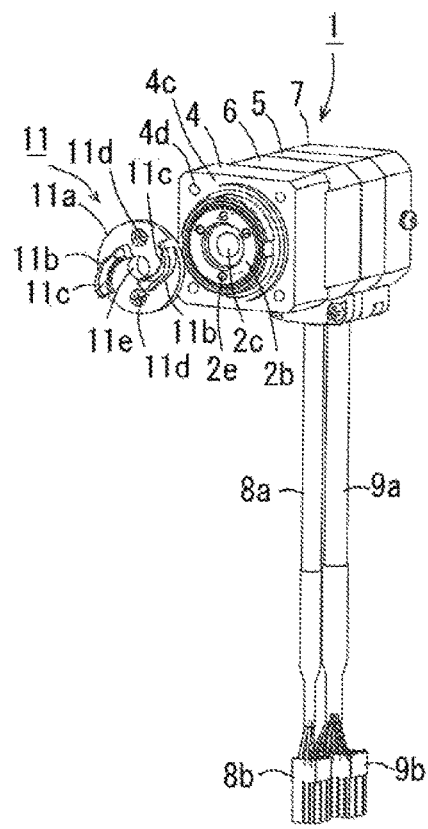
FIG. 6 is a perspective view illustrating the cam-type hand mechanism in FIG. 5 with the cam pedestal member and the hand mechanism (not illustrated) removed from the motor shaft.

In order to replace the hand mechanism 10, the hand mechanism 10 is demounted from the end surface 4c (see FIG. 6) of the bearing retaining member 4 illustrated in FIG. 6 by removing the screws from the screw holes 10d provided at the four corners of the hand base member 10a illustrated in FIG. 5. Subsequently, as illustrated in FIG. 6, the cam pedestal member 11 is demounted from the other end 2b of the rotor shaft 2 by removing the screws, not illustrated, from the cam-side screw holes 11d provided at two positions of the cam pedestal member 11. Accordingly, replacement with new cam pedestal member 11 and new hand mechanism 10 is achieved. For example, as illustrated in FIG. 9, replacement with a cam pedestal member 11 provided with the three-dimensional cams 11b at three positions and replacement with a hand mechanism 10 (see FIG. 1E) provided with the claw portions 12 at three positions are achieved. In this case, replacement is achieved by aligning the cam-side screw holes 11d (see FIG. 9) formed in the cam pedestal member 11 at three positions different in phase by 120 degrees and the motor-side screw holes 2e formed in the corresponding rotor shaft 2 and securing with screws.

In the above-described examples, the stepping motor is employed as the motor. However, other motors such as a DC brushless motor may also be employed.

In the above-described examples, the cam pedestal member 11 is directly attached to the rotor shaft 2. However, when the decelerator is provided, the cam pedestal member 11 may be detachably attached to a rotation transmitting member of the decelerator.

In addition, the number of the claw portions 12 to be provided on the hand mechanism 10 may be four or more, and the shapes of the claw portions 12 are not limited to the illustrations. The same applies to the cam pedestal member 11 provided with the three-dimensional cams 11b corresponding to the number of the claw portions 12.

What is claimed is:

1. A cam-type hand mechanism comprising:
   a motor;
   a cam pedestal member, the cam pedestal member including a cam base portion detachably assembled directly or indirectly to a rotor shaft extending from the motor, three-dimensional cams including a plurality of cam guiding surfaces continuing over a range from an outer edge of a through hole provided at a center of the cam base portion to an outer peripheral side, and being protruded at a plurality of positions, and
   a hand mechanism assembled to the motor constantly in abutment with the three-dimensional cam, the hand mechanism including a plurality of claw portions openable and closable about an axial line of the rotor shaft in association with a rotary motion of the three-dimensional cam,
   wherein the cam base portion includes cam-side coupling portions configured to couple the cam pedestal member directly or indirectly to the rotor shaft at a plurality of positions in areas between radially inner ends and radially outer ends of the adjacent three-dimensional cams.

2. The cam-type hand mechanism according to claim 1, wherein the rotor shaft is provided at an axial end with motor-side coupling portions at a plurality of positions, the motor-side coupling portions corresponding to cam-side coupling portions provided on the cam base portion.

3. The cam-type hand mechanism according to claim 2, wherein the cam-side coupling portions and the motor-side coupling portions are screw holes, and the cam pedestal member is detachably attached to the axial end of the rotor shaft by aligning the cam-side coupling portions and the motor-side coupling portion with each other and screw-fitting coupling screws.

4. The cam-type hand mechanism according to claim 1 wherein the hand mechanism includes a hand base portion assembled to the motor; and claw supporting portions configured to rotatably support the claw portions about an axis orthogonally disposed with respect to a direction of an axial line of the rotor shaft, and wherein the claw portions slide in a state in which a plurality of cam follower surfaces provided at root end portions are in constantly abutment with the corresponding plurality of cam guiding surfaces.

5. The cam-type hand mechanism according to claim 1, wherein the rotor shaft is a hollow shaft provided with a hollow shaft hole and is assembled in communication with the through hole provided in the cam base portion of the cam pedestal member.

* * * * *